US009262693B2

(12) United States Patent  
Kamiya

(10) Patent No.: US 9,262,693 B2  
(45) Date of Patent: Feb. 16, 2016

(54) OBJECT DETECTION APPARATUS

(71) Applicant: DENSO CORPORATION, Kariya, Aichi-pref. (JP)

(72) Inventor: Yasunori Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/254,133

(22) Filed: Apr. 16, 2014

(65) Prior Publication Data

US 2014/0321759 A1  Oct. 30, 2014

(30) Foreign Application Priority Data

Apr. 26, 2013 (JP) ................................. 2013-093813

(51) Int. Cl.
*G06K 9/64* (2006.01)
*G06K 9/62* (2006.01)
(Continued)

(52) U.S. Cl.
CPC .......... *G06K 9/6202* (2013.01); *G06K 9/00993* (2013.01); *G06K 9/6215* (2013.01); *G06K 9/6227* (2013.01); *G06K 9/6807* (2013.01); *G06K 9/64* (2013.01)

(58) Field of Classification Search
CPC ... G06K 9/325; G06K 9/3208; G06K 9/6203; G06K 9/00288; G06K 9/3241; G11B 27/11; H04N 5/775; H04N 5/23212; H04N 5/23219; H04N 5/23293; G06T 7/004; G06T 7/20; G10L 25/87; G06F 3/0346; G01S 17/936; G05D 2201/0213
USPC ......... 382/103, 135, 181, 209, 217, 305, 118, 382/171, 177, 190; 704/10, 239, 246, 253
See application file for complete search history.

(56) References Cited

U.S. PATENT DOCUMENTS 4,881,266 A * 11/1989 Nitta ....................... G10L 15/04  
 704/239  
5,034,991 A * 7/1991 Hagimae .............. G06K 9/3283  
 382/171  
(Continued)

FOREIGN PATENT DOCUMENTS

JP  2005-259031  9/2005  
JP  2006-163726  6/2006  
(Continued)

OTHER PUBLICATIONS

Office Action dated Apr. 14, 2015 in corresponding Japanese Application No. 2013-093813.

(Continued)

*Primary Examiner* — Vu Le  
*Assistant Examiner* — Aklilu Woldemariam  
(74) *Attorney, Agent, or Firm* — Harness, Dickey & Pierce, P.L.C.

(57) ABSTRACT

An object detection apparatus includes a storage section storing a plurality of selection patterns as combinations of one of a plurality of recognition dictionaries and one of a plurality of image recognition algorithms, a specifying means for specifying at least one of a distance from a position at which an input image is taken and a target corresponding to the detection object within the input image and a state of light of the input image, a selection means for selecting one from the plurality of the selection patterns based on at least one of the distance and the state of the light specified by the specifying means, and a detection means for detecting the detection object within the input image by performing an image recognition process using the image recognition dictionary and the image recognition algorithm included in the selection pattern selected by the selection means.

3 Claims, 3 Drawing Sheets

(51) Int. Cl.
    *G06K 9/00*              (2006.01)
    *G06K 9/68*              (2006.01)

(56) References Cited

U.S. PATENT DOCUMENTS

| | | | | |
|---|---|---|---|---|
| 5,367,625 | A * | 11/1994 | Ishitani | G06F 3/04842 345/619 |
| 5,588,074 | A * | 12/1996 | Sugiyama | G06K 9/6807 382/190 |
| 5,841,901 | A * | 11/1998 | Arai | G06K 9/6292 382/187 |
| 5,901,255 | A * | 5/1999 | Yagasaki | G06K 9/6807 382/227 |
| 5,917,944 | A * | 6/1999 | Wakisaka | G06F 17/2755 382/190 |
| 6,104,833 | A * | 8/2000 | Naoi | G06K 9/6807 382/177 |
| 6,125,206 | A * | 9/2000 | Yokota | G06K 9/6255 382/189 |
| 6,282,508 | B1 * | 8/2001 | Kimura | G06F 17/2863 704/10 |
| 6,345,111 | B1 * | 2/2002 | Yamaguchi | G06F 3/011 382/118 |
| 6,466,926 | B1 * | 10/2002 | Kawatani | G06K 9/6234 705/28 |
| 6,788,829 | B1 * | 9/2004 | Murakawa | G06K 9/6203 358/403 |
| 7,120,278 | B2 * | 10/2006 | Sukegawa | G06K 9/6255 348/152 |
| 7,272,260 | B1 * | 9/2007 | Kakiuchi | G06K 9/4609 382/135 |
| 2002/0028001 | A1 * | 3/2002 | Doi | G06T 7/20 382/103 |
| 2004/0143374 | A1 * | 7/2004 | Horst | B61C 17/12 701/19 |
| 2005/0286743 | A1 * | 12/2005 | Kurzweil et al. | 382/114 |
| 2006/0253491 | A1 * | 11/2006 | Gokturk | G06F 17/30256 |
| 2008/0091627 | A1 * | 4/2008 | Hosoi | G06N 99/005 706/12 |
| 2008/0304719 | A1 * | 12/2008 | Winkler | G06K 9/00402 382/119 |
| 2011/0090359 | A1 * | 4/2011 | Sagawa | G06K 9/3233 348/222.1 |
| 2011/0131038 | A1 * | 6/2011 | Oyaizu | G10L 15/06 704/10 |
| 2011/0229020 | A1 * | 9/2011 | Yoshii | G06K 9/6282 382/159 |
| 2011/0289028 | A1 * | 11/2011 | Sato | G06K 9/623 706/12 |
| 2014/0241580 | A1 | 8/2014 | Kamiya | |
| 2014/0270548 | A1 | 9/2014 | Kamiya | |

FOREIGN PATENT DOCUMENTS

| | | |
|---|---|---|
| JP | 2007-249841 | 9/2007 |
| JP | 2007-328630 | 12/2007 |
| JP | 2009-122859 | 6/2009 |
| JP | 2009-237897 | 10/2009 |
| JP | 2009-295112 | 12/2009 |
| JP | 2010-079716 | 4/2010 |
| JP | 2010-271861 | 12/2010 |
| JP | 2014-164426 | 9/2014 |
| JP | 2014-178736 | 9/2014 |

OTHER PUBLICATIONS

Office Action dated Nov. 10, 2015 issued in the corresponding JP application No. 2013-093813 in Japanese with English translation.

* cited by examiner

FIG.1

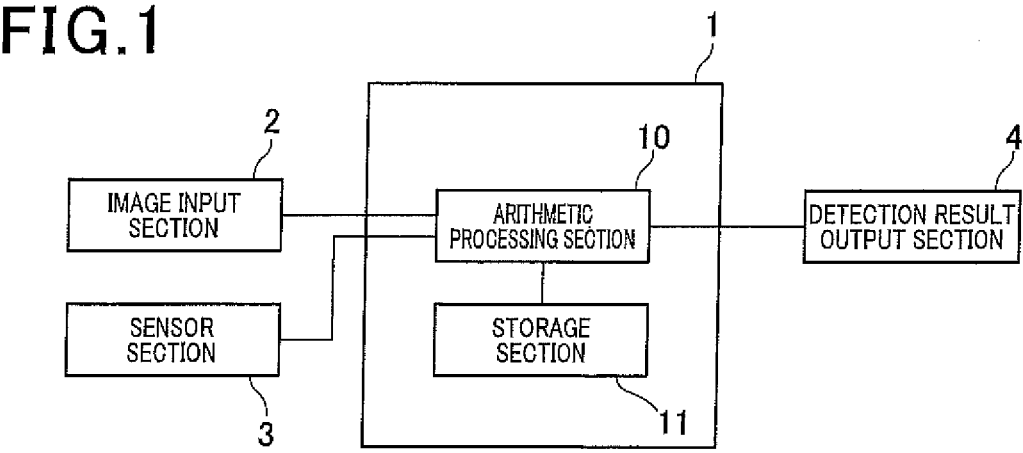

FIG.2A

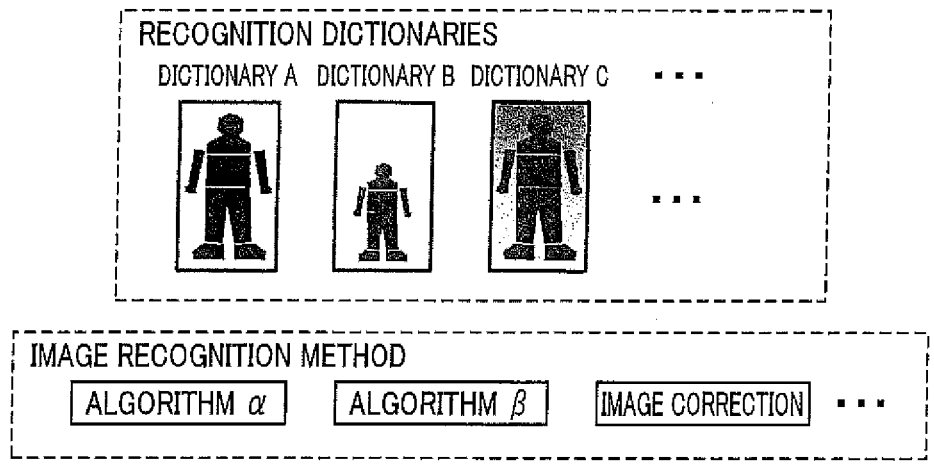

FIG.2B

PATTERN A = DICTIONARY a + ALGORITHM α
PATTERN B = DICTIONARY b + ALGORITHM α
PATTERN C = DICTIONARY c + ALGORITHM α
PATTERN D = DICTIONARY a + ALGORITHM β
PATTERN E = DICTIONARY b + ALGORITHM β
PATTERN F = DICTIONARY c + ALGORITHM β
PATTERN G = DICTIONARY a + ALGORITHM α + IMAGE CORRECTION
PATTERN H = DICTIONARY b + ALGORITHM α + IMAGE CORRECTION
PATTERN I = DICTIONARY c + ALGORITHM α + IMAGE CORRECTION
PATTERN J = DICTIONARY a + ALGORITHM β + IMAGE CORRECTION
PATTERN K = DICTIONARY b + ALGORITHM β + IMAGE CORRECTION
PATTERN L = DICTIONARY c + ALGORITHM β + IMAGE CORRECTION

⋮

FIG.3
(a) SPECIFYING OF DISTANCE TO TARGET
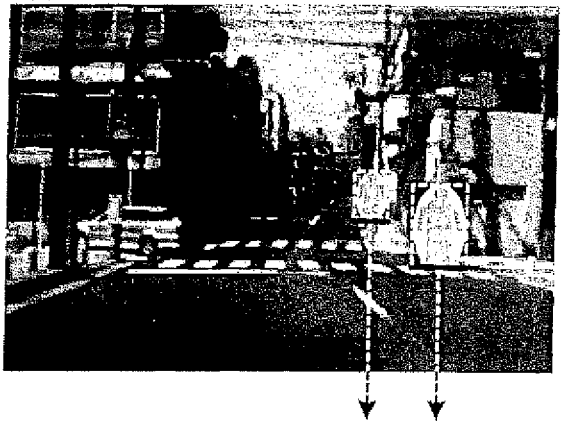
- DATA FROM RADAR
- POSITION OF LOWERMOST PART OF IMAGE AREA
(b) SPECIFYING OF BRIGHTNESS, CONTRAST AND COLOR
- BRIGHTNESS DATA OF PIXELS OF IMAGE AREA
- DATA FROM LUMINANCE SENSOR AND SO ON
DETERMINATION OF RECOGNITION DICTIONARY AND IMAGE RECOGNITION ALGORITHM

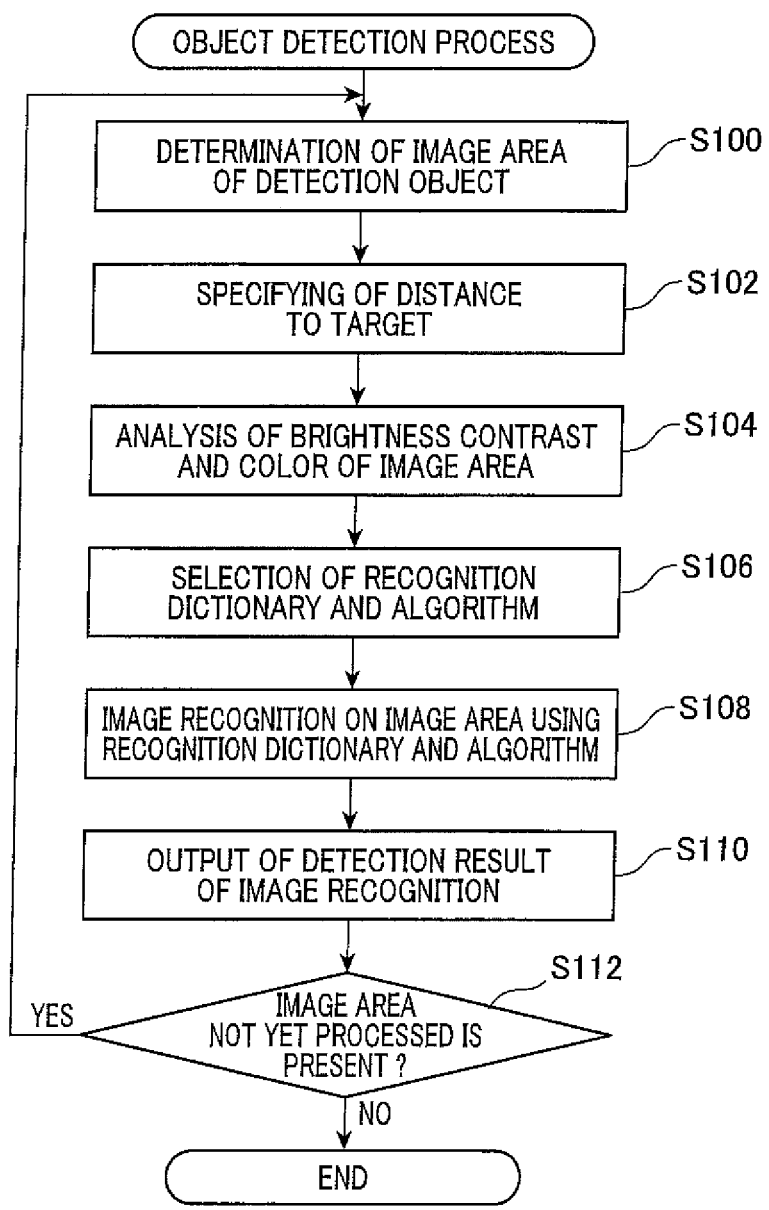

OBJECT DETECTION APPARATUS

This application claims priority to Japanese Patent Application No. 2013-93813 filed on Apr. 26, 2013, the entire contents of which are hereby incorporated by reference.

BACKGROUND OF THE INVENTION

1. Field of the Invention

The present invention relates to an object detection apparatus for detecting an object from an input image using an image recognition dictionary.

2. Description of Related Art

It is known to perform image recognition based on an image recognition algorithm on an input image obtained by a camera or the like mounted on an own vehicle using an image recognition dictionary describing reference data regarding detection objects for the purpose of detecting an object such as a human or a vehicle present in front or back of the own vehicle. For example, Japanese Patent application Laid-open No. 2010-79716 describes a technique in which an image obtained by an imaging device is collated with template data (recognition dictionary) for detection of a pedestrian.

The recognition dictionary used for detecting a detection object is prepared in advance so as to suit assumed environment conditions. Accordingly, if the actual environmental conditions at the time when the imaging device obtains an image are far apart from the assumed environmental conditions, the robustness of the image recognition performed using the recognition dictionary is degraded, and the detection performance is lowered.

Environment conditions which may affect the detection performance include the distance between the imaging position and a detection object, the brightness, contrast and color of an input image which depend on the solar radiation, weather and time of day. Hence, when the environment conditions vary greatly with time, the performance of object detection performed using the same recognition dictionary may be unstable.

SUMMARY

An exemplary embodiment provides an object detection apparatus including:

a storage section storing a plurality of selection patterns as combinations of one of a plurality of recognition dictionaries and one of a plurality of image recognition algorithms, each of the recognition dictionaries describing reference data of a detection object, each of the recognition algorithms being for recognizing the detection object within an input image based on the recognition dictionaries;

a specifying means for specifying at least one of a distance from a position at which the input image is taken to a target corresponding to the detection object within the input image and a state of light of the input image;

a selection means for selecting one from the plurality of the selection patterns based on at least one of the distance and the state of the light specified by the specifying means; and, a detection means for detecting the detection object within the input image by performing an image recognition process using the image recognition dictionary and the image recognition algorithm included in the selection pattern selected by the selection means.

Another exemplary embodiment provides an object detection apparatus including:

a storage section storing a plurality of selection patterns as combinations of one of a plurality of recognition dictionaries and an image recognition algorithm, each of the recognition dictionaries describing reference data of a detection object, the recognition algorithms being for recognizing the detection object from an input image based on the recognition dictionaries;

a specifying means for specifying at least one of a distance from a position at which the input image is taken and a target corresponding to the detection object within the input image and a state of light of the input image;

a selection means for selecting one from the plurality of the selection patterns based on at least one of the distance and the state of the light specified by the specifying means; and a detection means for detecting the detection object within the input image by performing an image recognition process using the image recognition dictionary and the image recognition algorithm included in the selection pattern selected by the selection means.

According to these embodiments, there are provided objection detection apparatuses capable of reliably detecting a detection object even when the environmental conditions around the detection object is changing significantly.

Other advantages and features of the invention will become apparent from the following description including the drawings and claims.

BRIEF DESCRIPTION OF THE DRAWINGS

In the accompanying drawings:

FIG. 1 is a diagram schematically showing the structure of an object detection system including an obstacle detection apparatus according to an embodiment of the invention;

FIG. 2A is a diagram showing an example of a plurality of recognition dictionaries and an image recognition method used in the obstacle detection apparatus according to the embodiment of the invention;

FIG. 2B is a diagram showing an example of selection patterns of the plurality of the recognition dictionaries and a plurality of image recognition algorithms;

FIG. 3 is a diagram showing a method of selecting from among the plurality of the recognition dictionaries and the plurality of image recognition algorithms in accordance with an input image; and FIG. 4 is a flowchart showing steps of an object detection process performed by the object detection apparatus according to the embodiment of the invention.

PREFERRED EMBODIMENTS OF THE INVENTION

FIG. 1 is a diagram schematically showing the structure of an object detection system including an object detection apparatus 1 according to an embodiment of the invention. This object detection system is mounted on a vehicle (may be referred to as the own vehicle hereinafter) for detecting specified detection objects such as a human, a vehicle and a traffic sign present in front of or behind the own vehicle. As shown in FIG. 1, the object detection system includes the object detection apparatus 1, an image input section 2, a sensor section 3 and a detection result output section 4.

The object detection apparatus 1, which includes an arithmetic processing section 10 and a storage section 11, detects an image of a detection object from an input image by performing an image recognition process on the input image using a recognition dictionary describing detection objects to be detected.

The arithmetic processing section 10 includes a CPU, a ROM, a RAM and an input/output interface. The arithmetic processing section 10 processes the input image received from the image input section 2, and outputs a detection result. The arithmetic processing section 10 operates to detect an image corresponding to a detection object using a recognition dictionary describing detection objects to be detected. The arithmetic processing section 10 performs image recognition on the input image by selecting an optimum one of combinations (selection patterns) of one of a plurality of recognition dictionaries and one of a plurality of image recognition algorithms prepared in advance to suit various conditions including the distance to a target and the state of the light such as brightness, contrast and color of the input image.

The storage section 11 stores programs regarding the recognition dictionaries describing reference data of detection objects and a method for performing image recognition using the recognition dictionaries. In this embodiment, the storage section 11 stores a plurality of different recognition dictionaries for the same detection objects, which are prepared in advance for different environmental conditions. The size, brightness, contrast and color of the same detection object are described differently for the same model of each detection object in these recognition dictionaries, because of differences in the environmental conditions including assumed distance between the detection object and the observation position (imaging position), and the assumed state of the light such as brightness and clearness which depend on weather and time of day.

The storage section 11 stores also a program describing an image recognition process. The image recognition process includes a plurality of different recognition algorithms including one for performing image recognition based on geometrical similarity between an input image and images contained in the recognition dictionary, and one for performing image recognition based on similarity in pixel values such as pixel average or histogram. Further, the image recognition process includes an image correcting function for adjusting the brightness, contrast, color, sharpness and so on before performing image recognition in order to increase detectability of image recognition.

FIG. 2A shows an example of a plurality of different recognition dictionaries and an image recognition method. In this example, different recognition dictionaries (a, b, c, . . . ) are prepared for various environmental conditions different in the distance to a detection object (human in this example), and brightness, sharpness and color in the vicinity of the detection object. In one of the recognition dictionaries, which is for use in detecting the detection object at a short (or long) distance, a model of the detection object is described to be small (or large) in size. In one of the recognition dictionaries, which is for use in detecting the detection object at a bright (or dark) place, the model of the detection objects is described to be bright (or dark). In one of the recognition dictionaries, which is for use in detecting the detection object in daylight (or nightfall or night-time), the model of the detection object is described to be pale (or reddish or bluish). In one of the recognition dictionaries, which is for use in detecting the detection object in environmental conditions where the image of the detection object is likely to become faint, for example, when the distance to the detection object is assumed to be rather distant, or when it is assumed to be raining or foggy, the model of the detection object is described to have low contrast at its contour. Also, in this example, the image recognition method includes a plurality of different image recognition algorithms (alpha, beta, gamma, . . . ), and an image correcting function.

As shown in FIG. 2B, a plurality of selection patterns (A, B, C, . . . ) which are combinations of the recognition dictionaries and the image recognition algorithms are defined in the storage section 11. These selection patterns are prepared to provide optimum detection performance for various environmental conditions taking into account their different algorithms and their different assumed environmental conditions.

For example, one of the selection patterns is appropriate for an environment where the distance to a detection object is small (or large) and an input image is bright (or dark). There may be a selection pattern prepared taking into account the contrast and state of color of an input image. The image correcting function may be provided in the selection patterns prepared to suit an environment where the sharpness of an input image is assumed to be considerably low to adjust the brightness, contrast or sharpness of the input image.

Returning to the explanation of FIG. 1, the image input section 2 includes a vehicle-mounted camera. An image obtained by the image input section 2 is inputted as an input image to the arithmetic processing section 10 of the object detection apparatus 1.

The sensor section 3 includes vehicle-mounted sensors including a distance measuring sensor such as a millimeter-wave radar or a laser radar, and an luminance sensor for measuring brightness outside the own vehicle. The detection result output section 4 operates to inform the vehicle driver of presence of a human or a vehicle and perform vehicle control in accordance with the detection result received from the object detection apparatus 1. The detection result output section 4 may be a control device of a safe driving system or a driving support system of the vehicle.

Here is explained a method of specifying environmental conditions used as decision criteria which the arithmetic processing section 10 of the object detection apparatus 1 uses to determine the selection pattern of the recognition dictionary and the image recognition algorithm with reference to FIG. 3.

In this embodiment, as shown in section (a) of FIG. 3, the distance to each object (target) within an input image received from the image input section 2 is specified as one of the environmental conditions. The distance to a target can be measured by scanning within the imaging range of the image inputting section 2 using a millimeter wave radar or a laser radar, for example.

Alternatively, the distance to a target may be estimated based on the position of the image area corresponding to the target at the time of scanning the input image using a model of the recognition dictionary. For example, the distance to a target can be estimated based on the position of the lowermost part of the image area corresponding to the target relative to the position of the vanishing point of an input image. In this case, if the lowermost part is at a high position close to the vanishing point, the target can be estimated to be remote from the imaging position. On the other hand, if the lowermost part is at a low position distant from the vanishing point, the target can be estimated to be close to the imaging position. The distance to a target may be specified by one of or combining the above two methods which use the distance measuring sensor and a model of the recognition dictionary, respectively.

In this embodiment, as shown in section (b) of FIG. 3, also the brightness, contrast and color state of the input image received from the image input section 2 are specified as one of the environmental conditions. More specifically, the brightness, contrast and color state of the input image are specified by analyzing brightness data (including the average value, center value, histogram, for example) of pixels constituting the image area corresponding to a detection object. The result of analysis of the brightness data may be combined with measured brightness outputted from the luminance sensor.

The arithmetic processing section 10 specifies the environmental conditions of the input image based on the specified distance to the target, and state of the light such as the brightness, contrast and color state of the input image. Thereafter, the arithmetic processing section 10 selects one from the recognition dictionaries and one from the image recognition algorithms which match the specified environmental conditions (see FIG. 2B).

Next, an object detection process performed by the arithmetic processing section 10 of the object detection apparatus 1 is explained with reference to the flowchart of FIG. 4.

In step S100, the arithmetic processing section 10 determines an object image area corresponding to a detection object within an unchecked image area of the input image received from the image input section 2. The object image area may be one of divided sub-areas constituting the entire of the input image, or an image area corresponding to a road or a sidewalk within the input image.

In step S102, the arithmetic processing section 10 specifies the distance between the target within the object image area determined in step S100 and the imaging position (vehicle position) in accordance with the method explained in the foregoing with reference to FIG. 3. In step S104, the arithmetic processing section 10 analyzes the state of the light including the brightness, contrast and color of the object image area determined in step S100 in accordance with the method explained in the foregoing with reference to FIG. 3.

In step S106, the arithmetic processing section 10 selects one from the recognition dictionaries and one from the image recognition algorithms based on the distance specified in step S102 and the state of the light analyzed in step S104. More specifically, the arithmetic processing section 10 specifies the environmental conditions for the object image area based on the specified distance to the target and the specified state of the light including the brightness, contrast and color of the object image area, and thereafter, selects one from the recognition dictionaries and one from the image recognition algorithms which match the specified environmental conditions.

In step S108, the arithmetic processing section 10 performs the image recognition process on the object image area using the recognition dictionary and the image recognition algorithm selected in step S106 to detect a detection object within the object image area. More specifically, the arithmetic processing section 10 scans the object image area using the selected recognition dictionary and performs the image recognition on the object image area using the selected image recognition algorithm. When the selected image recognition algorithm includes the image correcting function, the arithmetic processing section 10 corrects the object image area before performing the image recognition. In step S110, the arithmetic processing section 10 outputs the detection result of the image recognition process performed in step S108 to the detection result output section 4.

In step S112, the arithmetic processing section 10 checks whether or not there is an object image area not yet having been subjected to the image recognition process. If the check result is affirmative, the arithmetic processing section 10 returns to step S100. If the check result is negative, the arithmetic processing section 10 terminates this object detection process.

The object detection apparatus 1 described above provides the following advantages. The recognition dictionary and the image recognition algorithm used for recognizing a detection object can be switched depending on the distance to a target and the ambient surrounding. More specifically, it is possible to select one from a plurality of the combinations (selection patterns) of the recognition dictionaries and the image recognition algorithms prepared in advance for different environmental conditions such as the distance to a target and the brightness of an input image. Accordingly, the object detection performance can be kept high even when the environmental conditions are changing.

Modifications

The above embodiment is configured to select one of the combinations (selection patterns) of one of a plurality of different recognition dictionaries and one of a plurality of different image recognition algorithms prepared in advance. However, the above embodiment may be modified so as to select one from combinations of a plurality of different recognition dictionaries and a single image recognition algorithm. Further, the above embodiment may be modified so as to select one from combinations of a single recognition dictionary and one of a plurality of different image recognition algorithms.

In the above embodiment, an input image is divided into a plurality of sub-image areas, and one of the selection patterns of a plurality of different recognition dictionaries and a plurality of different image recognition algorithms is selected for each of the sub-image areas to perform the image recognition. However, the above embodiment may be modified so as to select one from the selection patterns for one entire input image.

In the above embodiment, the distance to a target and the state of the light (brightness, contrast and color etc) are used as decision criteria for specifying the environmental conditions of a detection object. However, it is possible to use only one of the distance to a target and the state of the light as the decision criteria. In the above embodiment, the object detection apparatus is mounted on a vehicle. It should be noted that the object detection apparatus of the present invention can be used for various vehicles, for example, an airplane, a vessel, a railroad vehicle, and also can be used for security equipment and a household electrical appliance.

The above explained preferred embodiments are exemplary of the invention of the present application which is described solely by the claims appended below. It should be understood that modifications of the preferred embodiments may be made as would occur to one of skill in the art.

What is claimed is:

1. An object detection apparatus comprising:
   a storage section storing a plurality of selection patterns as combinations of one of a plurality of recognition dictionaries and one of a plurality of image recognition algorithms, each of the recognition dictionaries describing reference data of a detection object, each of the recognition algorithms being for recognizing the detection object within an input image based on the recognition dictionaries;
   a processor operable as a specifying unit specifying at least one of a distance from a position of a vehicle on which the object detection apparatus is mounted to a target corresponding to the detection object within the input image and a state of light of the input image;
   the processor operable as a selection unit selection one from the plurality of the selection patterns based on at least one of the distance from the position of the vehicle to the target and the state of the light specified by the specifying unit; and
   the processor operable as a detection unit detecting the detection object within the input image by performing an image recognition process using the image recognition dictionary and the image recognition algorithm included in the selection pattern selected by the selection unit;

wherein the distance to the target is estimated based on a position of a lowermost part of the input image corresponding to the target relative to a position of a vanishing point of the input image.

2. The object detection apparatus according to claim 1, wherein the specifying unit specifies at least one of brightness, contrast and color of the input image as the state of light of the input image.

3. An object detection apparatus comprising:
a storage section storing a plurality of selection patterns as combinations of one of a plurality of recognition dictionaries and an image recognition algorithm, each of the recognition dictionaries describing reference data of a detection object, the recognition algorithms being for recognizing the detection object from an input image based on the recognition dictionaries;
a processor operable as a specifying unit specifying at least one of a distance from a position of a vehicle on which the object detection apparatus is mounted and a target corresponding to the detection object within the input image and a state of light of the input image;
the processor operable as a selection unit selecting one from the plurality of the selection patterns based on at least one of the distance from the position of the vehicle to the target and the state of the light specified by the specifying unit; and
the processor operable as a detection unit detecting the detection object within the input image by performing an image recognition process using the image recognition dictionary and the image recognition algorithm included in the selection pattern selected by the selection unit;
wherein the distance to the target is estimated based on a position of a lowermost part of the input image corresponding to the target relative to a position of a vanishing point of the input image.

* * * * *

UNITED STATES PATENT AND TRADEMARK OFFICE
CERTIFICATE OF CORRECTION

PATENT NO. : 9,262,693 B2  
APPLICATION NO. : 14/254133  
DATED : February 16, 2016  
INVENTOR(S) : Yasunori Kamiya It is certified that error appears in the above-identified patent and that said Letters Patent is hereby corrected as shown below:

Claims

At column 6, claim 1, line 57, delete "selection" and insert --selecting--.

Signed and Sealed this  
Twenty-eighth Day of June, 2016

Michelle K. Lee  
*Director of the United States Patent and Trademark Office*